US010943188B2

(12) United States Patent
Polk et al.

(10) Patent No.: US 10,943,188 B2
(45) Date of Patent: Mar. 9, 2021

(54) VIRTUAL QUEUING TECHNIQUES

(71) Applicant: Universal City Studios LLC, Universal City, CA (US)

(72) Inventors: Jeff Polk, Orlando, FL (US); Dave Derda, Orlando, FL (US); Thomas Martin Geraghty, Orlando, FL (US); Justin Michael Schwartz, Orlando, FL (US); Mark James Traynor, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 363 days.

(21) Appl. No.: 15/807,411

(22) Filed: Nov. 8, 2017

(65) Prior Publication Data

US 2018/0129984 A1    May 10, 2018

Related U.S. Application Data

(60) Provisional application No. 62/419,837, filed on Nov. 9, 2016, provisional application No. 62/419,833, filed on Nov. 9, 2016.

(51) Int. Cl.
*G06Q 10/02*       (2012.01)
*A63G 31/00*       (2006.01)
(Continued)

(52) U.S. Cl.
CPC ............. *G06Q 10/02* (2013.01); *A63G 31/00* (2013.01); *G06Q 10/06311* (2013.01); *G07C 11/00* (2013.01); *G07C 2011/02* (2013.01)

(58) Field of Classification Search
CPC .... G06Q 10/02; G07C 11/00; G07C 2011/02; G07C 2011/04
See application file for complete search history.

(56) References Cited

U.S. PATENT DOCUMENTS 5,006,983 A * 4/1991 Wayne .................. G06Q 10/06
                                                      705/7.13
5,192,247 A * 3/1993 Barr ....................... A63G 31/16
                                                      472/60
(Continued)

FOREIGN PATENT DOCUMENTS

CN         101498586 A      8/2009
CN         101833698 A      9/2010
(Continued)

OTHER PUBLICATIONS

Prenhall (https://web.archive.org/web/20060517181306/http://wps.prenhall.com/wps/media/objects/2234/2288589/ModD.pdf).*
(Continued)

*Primary Examiner* — Kevin H Flynn
*Assistant Examiner* — Emmett K. Walsh
(74) *Attorney, Agent, or Firm* — Fletcher Yoder P.C.

(57) ABSTRACT

The virtual queue system includes a virtual queue controller comprising a processor and a memory, wherein the memory stores instructions executable by the processor and is configured to receive a request, the request being associated with an individual guest, for a position in a virtual queue of an attraction, assign the individual guest to the position in the virtual queue in response to the request, receive ride schedule data for the attraction comprising information about a change in status of individual rides of the attraction, and determine a wait time for the individual guest for the attraction based at least on the position of the individual guest in the virtual queue, the ride schedule data, and historical guest throughput at the attraction. The virtual queue system is further configured to output a signal to a guest-associated device indicating the wait time for the attraction.

6 Claims, 5 Drawing Sheets

(51) Int. Cl.
  *G06Q 10/06*     (2012.01)
  *G07C 11/00*     (2006.01)

(56) References Cited

U.S. PATENT DOCUMENTS

| | | | |
|---|---|---|---|
| 5,502,806 A | 3/1996 | Mahoney et al. | |
| 5,566,327 A | 10/1996 | Sehr | |
| 5,694,514 A | 12/1997 | Evans et al. | |
| 5,946,444 A | 8/1999 | Evans et al. | |
| 5,978,770 A | 11/1999 | Waytena et al. | |
| 5,987,420 A | 11/1999 | Maeda et al. | |
| 5,987,421 A | 11/1999 | Chuang | |
| 6,078,928 A | 6/2000 | Schnase et al. | |
| 6,142,368 A | 11/2000 | Mullins et al. | |
| 6,173,209 B1 * | 1/2001 | Laval | G06Q 10/02 235/382 |
| 6,259,786 B1 | 7/2001 | Gisby | |
| 6,307,952 B1 | 10/2001 | Dietz | |
| 6,424,623 B1 | 7/2002 | Borgstahl et al. | |
| 6,526,158 B1 | 2/2003 | Goldberg | |
| 6,529,786 B1 | 3/2003 | Sim | |
| 6,535,376 B2 | 3/2003 | Fujita et al. | |
| 6,629,019 B2 | 9/2003 | Legge et al. | |
| 6,748,364 B1 | 6/2004 | Waytena et al. | |
| 6,785,539 B2 | 8/2004 | Hale et al. | |
| 6,813,608 B1 | 11/2004 | Baranowski | |
| 6,819,759 B1 | 11/2004 | Khuc et al. | |
| 6,845,361 B1 | 1/2005 | Dowling | |
| 6,873,260 B2 | 3/2005 | Lancos et al. | |
| 6,889,098 B1 | 5/2005 | Laval et al. | |
| 6,889,900 B2 | 5/2005 | Davies et al. | |
| 6,937,998 B1 | 8/2005 | Swartz et al. | |
| 7,029,400 B2 | 4/2006 | Briggs | |
| 7,047,205 B2 | 5/2006 | Hale et al. | |
| 7,136,822 B2 | 11/2006 | Kimura et al. | |
| 7,152,038 B2 * | 12/2006 | Murashita | G06Q 10/02 705/5 |
| 7,188,767 B2 | 3/2007 | Penuela et al. | |
| 7,204,425 B2 | 4/2007 | Mosher, Jr. et al. | |
| 7,212,983 B2 | 5/2007 | Redmann et al. | |
| 7,222,080 B2 | 5/2007 | Hale et al. | |
| 7,224,967 B2 | 5/2007 | Hale et al. | |
| 7,286,966 B2 * | 10/2007 | Hotta | F01D 5/005 702/184 |
| 7,327,251 B2 | 2/2008 | Corbett, Jr. | |
| 7,366,512 B1 | 4/2008 | Kefalas et al. | |
| 7,400,932 B2 | 7/2008 | Ackley et al. | |
| 7,430,411 B2 | 9/2008 | Sengupta et al. | |
| 7,496,445 B2 | 2/2009 | Mohsini et al. | |
| 7,505,474 B2 | 3/2009 | Walter | |
| 7,516,148 B2 | 4/2009 | Waytena et al. | |
| 7,532,941 B2 | 5/2009 | Hale et al. | |
| 7,541,926 B2 | 6/2009 | Dugan et al. | |
| 7,603,321 B2 | 10/2009 | Gurvey | |
| 7,642,921 B2 | 1/2010 | Cutler et al. | |
| 7,674,184 B2 | 3/2010 | Briggs et al. | |
| 7,685,009 B2 | 3/2010 | Halavais et al. | |
| 7,685,014 B2 | 3/2010 | Dean | |
| 7,706,904 B2 | 4/2010 | Jones et al. | |
| 7,720,718 B2 | 5/2010 | Hale et al. | |
| 7,729,382 B2 | 6/2010 | Rosner et al. | |
| 7,739,925 B2 | 6/2010 | Foster | |
| 7,752,146 B2 | 7/2010 | Lert, Jr. | |
| 7,756,745 B2 | 7/2010 | Leet et al. | |
| 7,775,894 B2 | 8/2010 | Henry et al. | |
| 7,778,937 B2 | 8/2010 | Ferrara et al. | |
| 7,787,965 B2 | 8/2010 | Hale et al. | |
| 7,788,215 B2 | 8/2010 | Trowbridge et al. | |
| 7,793,109 B2 | 9/2010 | Ortiz | |
| 7,801,629 B2 | 9/2010 | Hale et al. | |
| 7,801,752 B2 | 9/2010 | Neulight | |
| 7,802,724 B1 | 9/2010 | Nohr | |
| 7,817,990 B2 | 10/2010 | Pamminger et al. | |
| 7,826,966 B2 | 11/2010 | Little et al. | |
| 7,837,567 B2 | 11/2010 | Holzberg et al. | |
| 7,881,713 B2 | 2/2011 | Hale et al. | |
| 7,885,763 B2 | 2/2011 | Havens | |
| 7,895,066 B2 | 2/2011 | Waytena et al. | |
| 7,921,297 B2 | 4/2011 | Ortiz et al. | |
| 7,942,320 B2 | 5/2011 | Joe | |
| 7,966,215 B1 | 6/2011 | Myers et al. | |
| 7,994,910 B2 | 8/2011 | Brooks et al. | |
| 8,016,667 B2 | 9/2011 | Benbrahim | |
| 8,082,165 B2 | 12/2011 | Natsuyana et al. | |
| 8,126,782 B1 | 2/2012 | Zhu et al. | |
| 8,200,515 B2 | 6/2012 | Natsuyama et al. | |
| 8,226,493 B2 | 7/2012 | Briggs et al. | |
| 8,231,047 B2 | 7/2012 | Canora | |
| 8,253,533 B2 | 8/2012 | Jones | |
| 8,253,542 B2 | 8/2012 | Canora et al. | |
| 8,275,767 B2 | 9/2012 | Shepherd et al. | |
| 8,284,924 B2 | 10/2012 | Dube et al. | |
| 8,294,549 B2 | 10/2012 | Samovar et al. | |
| 8,296,983 B2 | 10/2012 | Padgett et al. | |
| 8,313,381 B2 | 11/2012 | Ackley et al. | |
| 8,330,587 B2 | 12/2012 | Kupstas | |
| 8,333,321 B2 | 12/2012 | Gressel et al. | |
| 8,396,001 B2 | 3/2013 | Jung et al. | |
| 8,396,727 B2 | 3/2013 | Waytena et al. | |
| 8,401,334 B2 | 3/2013 | Neville et al. | |
| 8,416,087 B2 | 4/2013 | Canora et al. | |
| 8,424,716 B2 | 4/2013 | Hegan et al. | |
| 8,425,314 B2 | 4/2013 | Benbrahim | |
| 8,430,749 B2 | 4/2013 | Nelson et al. | |
| 8,452,708 B1 | 5/2013 | Birenbaum et al. | |
| 8,453,926 B2 | 6/2013 | Hunt | |
| 8,462,994 B2 | 6/2013 | Ortiz et al. | |
| 8,489,451 B2 | 7/2013 | Ramchandani | |
| 8,489,657 B2 | 7/2013 | Shepherd et al. | |
| 8,498,900 B1 | 7/2013 | Spirin et al. | |
| 8,500,031 B2 | 8/2013 | Naelon | |
| 8,510,136 B2 | 8/2013 | Charania et al. | |
| 8,510,163 B2 | 8/2013 | Hess et al. | |
| 8,565,735 B2 | 10/2013 | Wohlwend et al. | |
| 8,577,734 B2 | 11/2013 | Treyz et al. | |
| 8,581,721 B2 | 11/2013 | Asher et al. | |
| 8,608,548 B2 | 12/2013 | Mattice et al. | |
| 8,612,278 B1 | 12/2013 | Ashley, Jr. et al. | |
| 8,616,984 B2 | 12/2013 | Mattice et al. | |
| 8,618,935 B2 | 12/2013 | Felt et al. | |
| 8,654,965 B2 | 2/2014 | Dube et al. | |
| 8,700,005 B1 | 4/2014 | Kiraly et al. | |
| 8,731,997 B2 | 5/2014 | Corbett et al. | |
| 8,732,101 B1 | 5/2014 | Wilson et al. | |
| 8,750,576 B2 | 6/2014 | Huang et al. | |
| 8,750,784 B2 | 6/2014 | Ortiz et al. | |
| 8,751,472 B2 | 6/2014 | Mei et al. | |
| 8,762,101 B2 | 6/2014 | Yuen et al. | |
| 8,773,245 B2 | 7/2014 | Canora et al. | |
| 8,774,839 B2 | 7/2014 | Busch | |
| 8,775,244 B2 | 7/2014 | Boss et al. | |
| 8,793,314 B2 | 7/2014 | Spivak et al. | |
| 8,798,643 B1 | 8/2014 | Boyle et al. | |
| 8,803,366 B2 | 8/2014 | Proud | |
| 8,810,430 B2 | 8/2014 | Proud | |
| 8,821,238 B2 | 9/2014 | Ackley et al. | |
| 8,827,810 B2 | 9/2014 | Weston et al. | |
| 8,830,030 B2 | 9/2014 | Arthurs et al. | |
| 8,831,963 B2 | 9/2014 | Backer et al. | |
| 8,851,372 B2 | 10/2014 | Zhou et al. | |
| 8,866,673 B2 | 10/2014 | Mendelson | |
| 8,870,641 B2 | 10/2014 | Dabrowskiqqq | |
| 8,879,440 B2 | 11/2014 | Guo et al. | |
| 8,896,485 B2 | 11/2014 | Mendelson | |
| 8,897,808 B2 | 11/2014 | Farris | |
| 8,913,011 B2 | 12/2014 | Barney et al. | |
| 8,924,432 B2 | 12/2014 | Richards et al. | |
| 8,948,541 B2 | 2/2015 | Neville et al. | |
| 8,949,146 B2 | 2/2015 | Fisher | |
| 8,954,091 B1 | 2/2015 | Boyle et al. | |
| 8,972,048 B2 | 3/2015 | Canora et al. | |
| 8,979,646 B2 | 3/2015 | Moser et al. | |
| 8,989,779 B1 | 3/2015 | Centore, III | |
| 9,002,736 B2 | 4/2015 | Wohlwend et al. | |

(56) References Cited

U.S. PATENT DOCUMENTS

| | | |
|---|---|---|
| 9,138,650 B2 | 9/2015 | Barney et al. |
| 9,149,717 B2 | 10/2015 | Barney et al. |
| 9,162,148 B2 | 10/2015 | Barney et al. |
| 10,127,744 B2 | 11/2018 | Butler |
| 10,185,513 B1* | 1/2019 | Vandewater ......... G06F 3/0643 |
| 2002/0007292 A1 | 1/2002 | Paxton et al. |
| 2002/0046068 A1 | 4/2002 | Koh |
| 2002/0070865 A1 | 6/2002 | Lancos et al. |
| 2002/0082897 A1 | 6/2002 | Menelly et al. |
| 2002/0099576 A1 | 7/2002 | MacDonald et al. |
| 2002/0116233 A1 | 8/2002 | Kuge et al. |
| 2002/0116235 A1 | 8/2002 | Grimm et al. |
| 2002/0174003 A1 | 11/2002 | Redmann et al. |
| 2003/0030561 A1 | 2/2003 | Yafuso et al. |
| 2003/0041105 A1 | 2/2003 | Patrick |
| 2003/0093167 A1 | 5/2003 | Sim |
| 2003/0102956 A1 | 6/2003 | McManus et al. |
| 2003/0129978 A1* | 7/2003 | Akiyama ................ H04B 3/54 455/426.1 |
| 2003/0195760 A1 | 10/2003 | Kim et al. |
| 2004/0006497 A1 | 1/2004 | Nestor et al. |
| 2004/0059614 A1 | 3/2004 | Brown et al. |
| 2004/0100390 A1 | 5/2004 | Giraldin et al. |
| 2004/0117219 A1 | 6/2004 | Sugimoto et al. |
| 2004/0117528 A1 | 6/2004 | Beacher et al. |
| 2004/0130680 A1* | 7/2004 | Zhou ................... H04N 7/0112 352/38 |
| 2004/0158482 A1 | 8/2004 | Hale et al. |
| 2004/0172316 A1 | 9/2004 | Hale et al. |
| 2004/0225540 A1 | 11/2004 | Waytena et al. |
| 2005/0045710 A1 | 3/2005 | Burke |
| 2005/0060173 A1 | 3/2005 | Hale et al. |
| 2005/0070258 A1 | 3/2005 | Stanco |
| 2005/0080675 A1 | 4/2005 | Lovegreen et al. |
| 2005/0168340 A1 | 8/2005 | Mosher, Jr. et al. |
| 2005/0198107 A1 | 9/2005 | Cuhls et al. |
| 2005/0200455 A1 | 9/2005 | Veni, III et al. |
| 2005/0240453 A1 | 10/2005 | Lyons |
| 2005/0278215 A1 | 12/2005 | Seele, Jr. |
| 2006/0002413 A1 | 1/2006 | Tsutazawa et al. |
| 2006/0068787 A1 | 3/2006 | Deshpande et al. |
| 2006/0100985 A1 | 5/2006 | Mark et al. |
| 2006/0147005 A1 | 7/2006 | Taub |
| 2006/0273920 A1 | 12/2006 | Doan et al. |
| 2007/0042748 A1 | 2/2007 | Macarthur |
| 2007/0064904 A1 | 3/2007 | Wesley |
| 2007/0088701 A1 | 4/2007 | Rao |
| 2007/0127691 A1* | 6/2007 | Lert, Jr. ................ G06Q 30/02 379/265.05 |
| 2007/0130313 A1 | 6/2007 | King |
| 2007/0156846 A1 | 7/2007 | Seward |
| 2007/0168390 A1* | 7/2007 | Mardirossian ......... G06Q 10/06 |
| 2007/0174042 A1 | 7/2007 | Thompson |
| 2007/0203763 A1 | 8/2007 | Ackley et al. |
| 2007/0225911 A1 | 9/2007 | Chanick |
| 2007/0233291 A1 | 10/2007 | Herde et al. |
| 2007/0244731 A1 | 10/2007 | Bayhydt et al. |
| 2007/0286220 A1* | 12/2007 | Stenning ................ G07C 11/00 370/412 |
| 2008/0022089 A1 | 1/2008 | Leedom |
| 2008/0040172 A1 | 2/2008 | Watkins |
| 2008/0055051 A1 | 3/2008 | Snyder et al. |
| 2008/0071587 A1 | 3/2008 | Granucci et al. |
| 2008/0080445 A1* | 4/2008 | Bayne ................... G06Q 10/02 370/342 |
| 2008/0086377 A1 | 4/2008 | Jain |
| 2008/0129487 A1 | 6/2008 | Crucs |
| 2008/0133283 A1 | 6/2008 | Backer et al. |
| 2008/0197984 A1 | 8/2008 | Peters et al. |
| 2008/0201227 A1 | 8/2008 | Bakewell et al. |
| 2008/0215385 A1 | 9/2008 | Veitch |
| 2008/0220871 A1 | 9/2008 | Asher et al. |
| 2008/0246592 A1 | 10/2008 | Waalkes et al. |
| 2008/0267107 A1* | 10/2008 | Rosenberg ............. H04H 20/61 370/312 |
| 2008/0270230 A1 | 10/2008 | Hendrickson et al. |
| 2008/0270305 A1 | 10/2008 | Andreasson et al. |
| 2008/0275630 A1 | 11/2008 | Regienczuk |
| 2008/0301264 A1 | 12/2008 | Mathai et al. |
| 2008/0319935 A1 | 12/2008 | Chandak |
| 2008/0319992 A1 | 12/2008 | Mathai et al. |
| 2009/0063205 A1 | 3/2009 | Shibasaki |
| 2009/0076875 A1* | 3/2009 | Lert, Jr. ................ G06Q 30/02 705/14.3 |
| 2009/0104874 A1 | 4/2009 | Ellis |
| 2009/0112638 A1 | 4/2009 | Kneller et al. |
| 2009/0116235 A1 | 5/2009 | Tsao et al. |
| 2009/0204449 A1 | 8/2009 | Waytena et al. |
| 2009/0216547 A1 | 8/2009 | Canora et al. |
| 2009/0222291 A1 | 9/2009 | Montavon et al. |
| 2009/0252318 A1* | 10/2009 | Smith ................... H04M 3/5238 379/265.1 |
| 2009/0259556 A1 | 10/2009 | Carroll et al. |
| 2009/0267728 A1 | 10/2009 | Mayrand |
| 2009/0276341 A1 | 11/2009 | McMahan et al. |
| 2009/0281817 A1* | 11/2009 | Ferrara ................. G06Q 10/06 705/1.1 |
| 2009/0281903 A1 | 11/2009 | Blatstein |
| 2009/0286559 A1 | 11/2009 | Janas et al. |
| 2009/0313062 A1 | 12/2009 | Natsuyama et al. |
| 2009/0319306 A1 | 12/2009 | Chanick |
| 2010/0017238 A1 | 1/2010 | Johnson |
| 2010/0017725 A1 | 1/2010 | McCarthy et al. |
| 2010/0062838 A1 | 3/2010 | Nguyen et al. |
| 2010/0063854 A1 | 3/2010 | Purvis et al. |
| 2010/0111377 A1 | 5/2010 | Monroe |
| 2010/0114968 A1 | 5/2010 | Dean |
| 2010/0161432 A1 | 6/2010 | Kumanov et al. |
| 2010/0250612 A1 | 9/2010 | Reuveni et al. |
| 2010/0262507 A1 | 10/2010 | Woycik et al. |
| 2010/0277276 A1* | 11/2010 | Bayne ...................... G07C 9/28 340/5.21 |
| 2010/0308964 A1 | 12/2010 | Ackley et al. |
| 2010/0317377 A1 | 12/2010 | Zou et al. |
| 2010/0321149 A1 | 12/2010 | Foster |
| 2010/0328025 A1 | 12/2010 | Razdan |
| 2011/0022425 A1 | 1/2011 | Block et al. |
| 2011/0040655 A1 | 2/2011 | Hendrickson |
| 2011/0133892 A1 | 6/2011 | Nohr |
| 2011/0158398 A1* | 6/2011 | Kannan ................ H04L 12/1827 379/265.09 |
| 2011/0178960 A1 | 7/2011 | Dever et al. |
| 2011/0227726 A1 | 9/2011 | Lee |
| 2011/0307547 A1 | 12/2011 | Backer et al. |
| 2012/0013462 A1 | 1/2012 | Tuck et al. |
| 2012/0016745 A1 | 1/2012 | Hendrickson |
| 2012/0040751 A1 | 2/2012 | Peters |
| 2012/0116789 A1* | 5/2012 | Boss ..................... G06Q 10/06 705/1.1 |
| 2012/0116863 A1 | 5/2012 | Boss et al. |
| 2012/0136793 A1 | 5/2012 | Barber-Mingo et al. |
| 2012/0147169 A1 | 6/2012 | Harper et al. |
| 2012/0184367 A1 | 7/2012 | Parrott et al. |
| 2012/0197746 A1 | 8/2012 | Harris |
| 2012/0197949 A1 | 8/2012 | Taylor et al. |
| 2012/0223834 A1 | 9/2012 | Hyatt |
| 2012/0271834 A1 | 10/2012 | Canora et al. |
| 2012/0287281 A1 | 11/2012 | Williams et al. |
| 2012/0315868 A1* | 12/2012 | Ben-Alexander ........................... G06Q 30/0251 455/404.1 |
| 2012/0323646 A1 | 12/2012 | Dube et al. |
| 2012/0330740 A1 | 12/2012 | Pennington et al. |
| 2013/0018661 A1 | 1/2013 | Padgett et al. |
| 2013/0018684 A1 | 1/2013 | Padgett et al. |
| 2013/0041696 A1 | 2/2013 | Richard |
| 2013/0045804 A1 | 2/2013 | Ruke |
| 2013/0065679 A1 | 3/2013 | Gelman et al. |
| 2013/0066660 A1 | 3/2013 | Kopitzke et al. |
| 2013/0073325 A1 | 3/2013 | Ross |
| 2013/0090957 A1 | 4/2013 | Popkey et al. |

(56) References Cited

U.S. PATENT DOCUMENTS

| | | |
|---|---|---|
| 2013/0091146 A1 | 4/2013 | Stanger |
| 2013/0102248 A1 | 4/2013 | Jay et al. |
| 2013/0103519 A1 | 4/2013 | Kountotsis et al. |
| 2013/0124234 A1 | 5/2013 | Nilsson et al. |
| 2013/0146659 A1 | 6/2013 | Zhou et al. |
| 2013/0151296 A1 | 6/2013 | Waytena et al. |
| 2013/0165154 A1 | 6/2013 | Joshi |
| 2013/0204651 A1 | 8/2013 | Gulec et al. |
| 2013/0204656 A1 | 8/2013 | Mahfouda et al. |
| 2013/0218612 A1 | 8/2013 | Hunt |
| 2013/0254027 A1 | 9/2013 | Silverman et al. |
| 2013/0254137 A1 | 9/2013 | Hunt |
| 2013/0293720 A1 | 11/2013 | Tyson et al. |
| 2013/0332208 A1 | 12/2013 | Mehta |
| 2013/0332509 A1 | 12/2013 | Schwartz et al. |
| 2014/0006451 A1 | 1/2014 | Mullis et al. |
| 2014/0046802 A1 | 2/2014 | Hosein et al. |
| 2014/0074404 A1 | 3/2014 | Hassan |
| 2014/0074523 A1 | 3/2014 | Turner et al. |
| 2014/0089075 A1 | 3/2014 | Sanchis et al. |
| 2014/0108149 A1 | 4/2014 | Jabara et al. |
| 2014/0113707 A1 | 4/2014 | Asher et al. |
| 2014/0114807 A1 | 4/2014 | Baker et al. |
| 2014/0132400 A1 | 5/2014 | Heaven et al. |
| 2014/0136105 A1 | 5/2014 | Chakraborty et al. |
| 2014/0156290 A1 | 6/2014 | Kozicki et al. |
| 2014/0156319 A1 | 6/2014 | Deeb |
| 2014/0162693 A1 | 6/2014 | Wachter et al. |
| 2014/0163934 A1* | 6/2014 | Zhang .................. G06Q 10/06 703/2 |
| 2014/0235276 A1 | 8/2014 | Lefkowitz |
| 2014/0236653 A1 | 8/2014 | Farrell |
| 2014/0249866 A1 | 9/2014 | Popkey et al. |
| 2014/0249994 A1 | 9/2014 | Proud |
| 2014/0256421 A1 | 9/2014 | Bishop et al. |
| 2014/0256446 A1 | 9/2014 | Barney et al. |
| 2014/0257889 A1 | 9/2014 | Ashley, Jr. et al. |
| 2014/0278688 A1 | 9/2014 | Sullivan et al. |
| 2014/0324488 A1 | 10/2014 | Boccelli |
| 2014/0343976 A1 | 11/2014 | Ahluwalia et al. |
| 2014/0343977 A1 | 11/2014 | Macina |
| 2014/0343995 A1 | 11/2014 | Backer et al. |
| 2014/0364148 A1 | 12/2014 | Block et al. |
| 2014/0378233 A1 | 12/2014 | Weston et al. |
| 2015/0009116 A1 | 1/2015 | Mangold et al. |
| 2015/0025919 A1 | 1/2015 | West |
| 2015/0026008 A1 | 1/2015 | Werbitt |
| 2015/0046202 A1 | 2/2015 | Hunt |
| 2015/0058129 A1 | 2/2015 | Nevid et al. |
| 2015/0058324 A1 | 2/2015 | Kauwe |
| 2015/0080081 A1 | 3/2015 | Kessman et al. |
| 2015/0081348 A1* | 3/2015 | Avera .................. G06Q 30/0269 705/5 |
| 2015/0083803 A1 | 3/2015 | Herron et al. |
| 2015/0088562 A1 | 3/2015 | Woods |
| 2015/0088671 A1 | 3/2015 | Xiong et al. |
| 2015/0088782 A1* | 3/2015 | Zhang .................. G06Q 30/0281 705/346 |
| 2015/0090242 A1 | 4/2015 | Weston et al. |
| 2015/0379434 A1* | 12/2015 | Argue .................. G06Q 10/02 705/5 |
| 2016/0055429 A1 | 2/2016 | Schwartz |
| 2016/0180412 A1* | 6/2016 | DuLeone .......... G06Q 30/0281 705/346 |
| 2016/0321548 A1* | 11/2016 | Ziskind .................. G06N 7/005 |

FOREIGN PATENT DOCUMENTS

| | | |
|---|---|---|
| CN | 201607767 U | 10/2010 |
| EP | 0958553 A1 | 11/1999 |
| EP | 1 690 222 A2 | 8/2006 |
| EP | 1 696 327 A1 | 8/2006 |
| JP | 2002032800 A | 1/2002 |
| JP | 2004178041 A | 6/2004 |
| WO | WO 9718534 A1 | 5/1997 |
| WO | WO 2003034350 A2 | 4/2003 |
| WO | WO 2004047353 A2 | 6/2004 |
| WO | WO 2005038612 A2 | 4/2005 |
| WO | WO 2005038688 A1 | 4/2005 |
| WO | WO 2005124699 A1 | 12/2005 |
| WO | WO2007004047 A2 | 1/2007 |
| WO | WO 2008128583 A1 | 10/2008 |
| WO | WO 2008144283 A1 | 11/2008 |
| WO | WO 2010089771 A2 | 8/2010 |

OTHER PUBLICATIONS

Cribme( https://web.archive.org/web/20151106024343/http://www.cribme.com/cu/data/Applied%20Math/Markov%20Processes/HW/hw5.pdf).*

AllABoutLean (https://web.archive.org/web/20150630191446/https://www.allaboutlean.com/littles-law/).*

Ahmadi (Ahmadi R.H. 1997. Managing Capacity and Flow at Theme Parks. Operations Research, vol. 45 No. 1, pp. 1-13).*

Touringplans.com, "Dragon Challenge", (Webarchive screen capture of Oct. 7, 2015, available at: https://touringplans.com/islands-of-adventure/attractions/dragon-challenge) (Year: 2015).*

Lemaster, Austin, "Analysis and Implications of Guest Attitudes Towards Queuing in Theme Parks" (2015) HIM 1990-2015. 1720. (Year: 2015).*

International Search Report and Written Opinion in corresponding PCT Application No. PCT/US2015/045897 dated Nov. 11, 2015 (11 pages).

International Search Report and Written Opinion in corresponding PCT Application No. PCT/US2013/044785 dated Apr. 30, 2014 (15 pages).

PCT/US2017/060922 Invitation to Pay Additional Fees dated Feb. 1, 2018.

CN201780069272.9 Office Action dated Jul. 22, 2020.

* cited by examiner

VIRTUAL QUEUING TECHNIQUES

CROSS-REFERENCE TO RELATED APPLICATIONS

The present application claims priority to U.S. Provisional Patent Application No. 62/419,837, entitled "Systems and Methods for Pre-Scheduling In Virtual Queuing Systems," filed Nov. 9, 2016; and to U.S. Provisional Patent Application No. 62/419,833, entitled "Systems and Methods for Automatically Monitoring and Dynamically Adjusting A Queue," filed on Nov. 9, 2016, which are incorporated by reference in their entireties herein for all purposes.

BACKGROUND

The present disclosure relates generally to the field of amusement parks. Specifically, embodiments of the present disclosure relate to techniques to manage amusement park experiences, including queuing for attractions.

Since the early twentieth century, amusement parks have substantially grown in popularity. In order to address this increasing demand, amusement parks have been expanding by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. Further, due to operating efficiencies, it is often desirable to limit the availability of attractions during low attendance times. Thus, queuing for attractions, which may limit participation in park activities, is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have waited hours in line to experience some of the more popular attractions at an amusement park. Additionally, it is now recognized that park capacity does not always result in efficient guest utilization of that capacity due to individual guest preferences for certain attractions over others. Accordingly, it is now recognized that it is desirable to improve amusement park queuing systems and methods.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a virtual queue system is provided. The virtual queue system includes a virtual queue controller comprising processor and a memory. The memory stores instructions executable by the processor and is configured to receive a request. The request is associated with an individual guest and is for a position in a virtual queue of an attraction comprising a plurality of rides. The virtual queue permits access of the individual guest to one of the plurality of rides of the attraction and guests in the virtual queue are distributed between the plurality of rides of the attraction via the virtual queue. The memory is further configured to assign the individual guest to the position in the virtual queue in response to the request, receive ride schedule data for the attraction comprising information about a change in status of individual rides of the plurality of rides, and determine a wait time for the individual guest for the attraction based at least on the position of the individual guest in the virtual queue, the ride schedule data, and historical guest throughput at the attraction. The virtual queue system further includes communications circuitry configured to output a signal to a guest-associated device indicating the wait time for the attraction In accordance with another embodiment, a virtual queue system is provided. The virtual queue system includes at least one monitoring device configured to monitor current queue conditions for an attraction and output a queue condition. The virtual queue system also includes a virtual queue controller comprising a controller and communications circuitry. The virtual queue controller is configured to receive the queue condition signal. The virtual queue controller is also configured to determine a current wait time for the attraction based on at least the queue condition signal and pre-set ride schedule data for the attraction, wherein the pre-set ride schedule data is indicative of a closure of a subset of a plurality of rides of the attraction. The virtual queue controller is further configured to output a queue modification signal in response to the determined current wait time being outside of a predetermined wait time range.

In accordance with another embodiment, a method is provided. The method includes the steps of providing ride schedule data for an attraction comprising a plurality of rides to a virtual queue controller, wherein the ride schedule data comprises scheduled times associated with closure of a subset of the plurality of rides, calculating variable guest throughput data for the attraction, wherein the variable guest throughput data is calculated based at least on current guest throughput data, the ride schedule data, and historical guest throughput data for the attraction, determining a current wait time for the next available position in a virtual queue for the attraction based on at least the next available position and the variable guest throughput data, wherein the current wait time overlaps the scheduled times such that the subset of the plurality of rides experiences the closure during the current wait time, and wherein the current wait time is calculated based on first variable guest throughput data indicative of a first guest throughput during the closure and second variable guest throughput data indicative of a second guest throughput during times outside of the closure; and outputting a current wait time signal to a display unit, a guest-associated device, or a combination thereof, indicating the current wait time to queue for the attraction.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
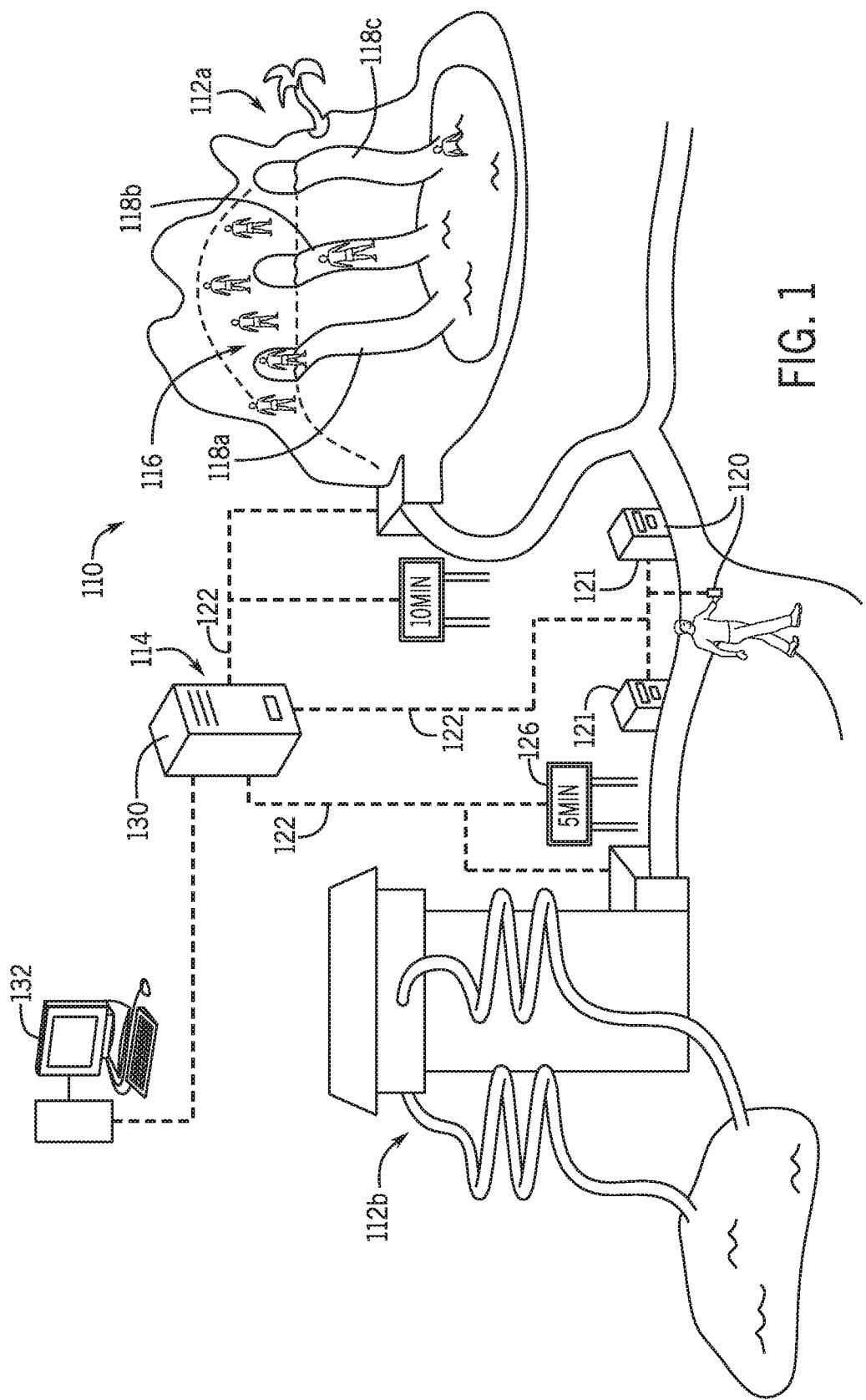
FIG. 1 is a schematic view of a theme park including a virtual queue system in accordance with present techniques.

Theme park or amusement park attractions have become increasingly popular, and various amusement park attractions have been created to provide passengers with unique motion and visual experiences. Guests entering the various amusement park attractions may utilize a virtual queuing system that places the guests in a virtual queue rather than a physical queue, which allows the guests to enjoy other features of the amusement park while their position in the virtual queue advances. To help guests plan their day, the virtual queuing system may estimate wait times (e.g., a length of time before the guest may enter the attraction) and provide a reminder to the guest that the time to enter the attraction is approaching. However, in determining wait times for guests for each attraction, certain virtual queuing systems assume average wait times or average guest return rates, or may utilize predetermined or preconfigured wait times for a static number of rides (e.g., guest-accepting features of the attraction, such as individual ride vehicles, individual lanes of a multi-lane slide, individual tracks of a multi-track attraction, etc.) within a specific attraction. Using data based on a static number of rides to determine wait times may fail to dynamically react to queue conditions (e.g., ride closures and openings at an attraction). Indeed, such virtual queuing systems may provide inaccurate wait times for guests, which may lead to excessive or deficient wait times and cause inefficient operation of the amusement park attractions.

With this in mind, certain embodiments of the present disclosure relate to virtual queuing systems that determine wait times by monitoring and/or dynamically evaluating the virtual queue based at least on queue conditions and scheduling information for the amusement park attraction. Embodiments of the present disclosure facilitate dynamically modifying queue operations in response to received feedback associated with the wait times. Specifically, certain embodiments of the present disclosure relate to determining wait times by monitoring and evaluating dynamic variations in open/close times for various attractions (or various rides within a specific attraction) in addition to queue conditions when determining wait times for attractions. In particular, the virtual queue system may be configured to utilize scheduled times for each attraction, current or real-time guest throughput for an attraction, estimated guest throughput in the future, a historical throughput for each attraction, and/or historical queue wait time information to accurately determine wait times for a particular attraction to avoid communicating inaccurate wait times to guests. In this manner, the virtual queuing system may help to prevent ride underutilization, ride overcrowding, and/or inefficient use of ride resources over a period of time. Additionally, certain embodiments of the present disclosure relate to automatically or dynamically modifying queue operations or the actual virtual queue in response to deficient or excessive wait times to further prevent inefficient operations, ride underutilization, ride overcrowding, and/or wasting ride resources over a period of time. Further, the virtual queuing system may be configured to monitor and track how the guests transition or move throughout the queue to provide for a more granular control of the virtual queue. Accordingly, based on a more granular control of the virtual queue, the virtual queuing system may be configured to have automatic and dynamic control of attraction access, thereby preventing ride starvation, overcrowding, or wasting other ride resources.

FIG. 1 is a schematic representation of a theme park 110 with at least one amusement park attraction 112 that may be accessed via a virtual queue that is controlled by a virtual queue system 114. Certain attractions 112 may feature a plurality of rides 118. For example, in the depicted embodiment, a water slide attraction 112a may include multiple lanes or slides (e.g., shown as rides 118a, 118b, and 118c) that are accessed via a single virtual queue, which permits access to a loading area 116 for the guests. That is, the guests assume a position in a virtual queue for the attraction 112a to enter the loading area 116. Once in the loading area 116, the guests are distributed between separate slides (i.e., rides 118a, 118b, and 118c) to experience the attraction 112. Accordingly, in the depicted embodiment by way of example, the attraction 112a is capable of accommodating multiple guests (e.g., two, three, or more) at a time. However, the guests may enter their assigned ride 118 at different rates, leading to dynamically changing real-time guest throughput rates for each ride 118 of the multi-ride attraction 112. For example, certain guests may be more hesitant than others, leading to a temporarily slower real-time guest throughput rate in one ride 118 relative to another. Further, the ride operators may have different efficiencies in distributing and loading guests into their respective rides 118. Accordingly, determining a total guest throughput for a multi-ride attraction 112 may be complex and may involve taking into account different real-time guest throughput rates at each individual ride 118 of the attraction 112 to determine a total guest throughput for the attraction 112.

While the depicted embodiments are shown in the context of water attractions, such as water slides, it should be understood that other multi-ride attractions 112 are contemplated. Further, the rides 118 of an individual attraction 112 may include any suitable number of rides 118 (slides, tracks, paths vehicles, etc.) accommodating any suitable number of guests that are nonetheless accessed via a single virtual queue for the attraction 112. In addition, the theme park 110 may also feature other attractions 112 that do not include multiple rides 118, e.g., single ride attractions 112.

In one embodiment, via the virtual queue system 114, guests are assigned a position in a virtual queue for the amusement park attraction 112 after submitting a request from a guest-associated device 120 (e.g., smart phone, guest wrist band) or a guest kiosk 121 and need not physically queue to enter the attraction 112 until a designated time. Thus, guests using a virtual queue may spend less time waiting in lines during their visit to the theme park 110. Additionally, data from the virtual queue provides guidance to the theme park for scheduling ride openings and closures to optimize guest throughput and amusement park attraction efficiency.

In some embodiments, the virtual queue system has a plurality of virtual queues, each corresponding to a separate amusement park attraction (e.g., 112a and 112b). To aid guests in determining which virtual queue to enter, the virtual queue system 114 is configured to output a wait time signal 122 indicating current wait times for each amusement park attraction 112. A display unit 126 may be configured to receive the wait time signal 122 and display the current wait times for guests within the theme park 110. The display unit 126 may be a central display unit configured to display the current wait times corresponding to a plurality of amusement park attractions. However, in some embodiments, the display unit 126 may be a localized display unit configured to display a current wait time for a single amusement park attraction. In another embodiment, a guest-associated device 120 (e.g., smart phone, guest wrist band, guest tracker, etc.) may receive the wait time signal 122 and display the current wait times for a guest (e.g., text message, smart phone app. notification, etc.).

In certain embodiments, the wait time signal 122 transmits the current wait time, a guest wait time (i.e., a wait time for an individual guest in the virtual queue), or some combination thereof. The current wait time indicates the time that an unqueued guest should anticipate waiting before entering the amusement park attraction 112 if joining the virtual queue at that time. In contrast, the guest wait time indicates the time that an individual guest, already having a position in the virtual queue, still has to wait until entering the amusement park attraction 112. Thus, the guest wait time corresponds to a specific position of an individual guest already queued in the virtual queue, whereas the current wait time corresponds to the next available position (i.e., an unassigned position) in the virtual queue.

In an embodiment, the virtual queue system 114 determines wait times based at least on scheduling information or ride schedule data for the attraction 112. Ride schedule data includes planned ride openings and closures for the attractions 112 at specified times during theme park hours as well as dynamic openings or closures in response to desired crowd flow. In the depicted embodiment, the attraction 112a includes three rides 118a, 118b, and 118c (e.g., slides, ride vehicles, seats, etc.) accessed by a single virtual queue. One or more of the three rides 118 may close during park hours, e.g., at specified times, determined by or included in a ride schedule, for the purpose of increasing attraction efficiency. For example, each of the three rides 118 may have an average historical guest throughput potential of one hundred and twenty guests per hour. Thus, in the depicted embodiment, a second ride 118b and a third ride 118c may close during times of the day when guest throughput is historically low. When guest throughput is low, opening only a first ride 118a may allow the attraction to maintain sufficient guest throughput to keep the wait times low while requiring fewer employees to operate the attraction 112a. In contrast, when guest throughput is historically high, the attraction may open the second ride 118b and the third ride 118c to increase guest throughput in order to minimize the wait times. Because opening and closing rides 118 of the attraction 112 dynamically changes real-time guest throughput and future guest throughput during the closure times, having the virtual queue system 114 determine wait times based at least on scheduling information may provide more accurate wait times for guests. Thus, scheduling information regarding dates, times, and other details as to ride closures and openings is sent to a virtual queue controller 130 of the virtual queue system 114. In certain embodiments, scheduling information is automatically transmitted to the virtual queue controller 130 from a theme park database. In other embodiments, a user may manually enter or modify scheduling information for the virtual queue controller using an operator interface 132.

Figure 2:
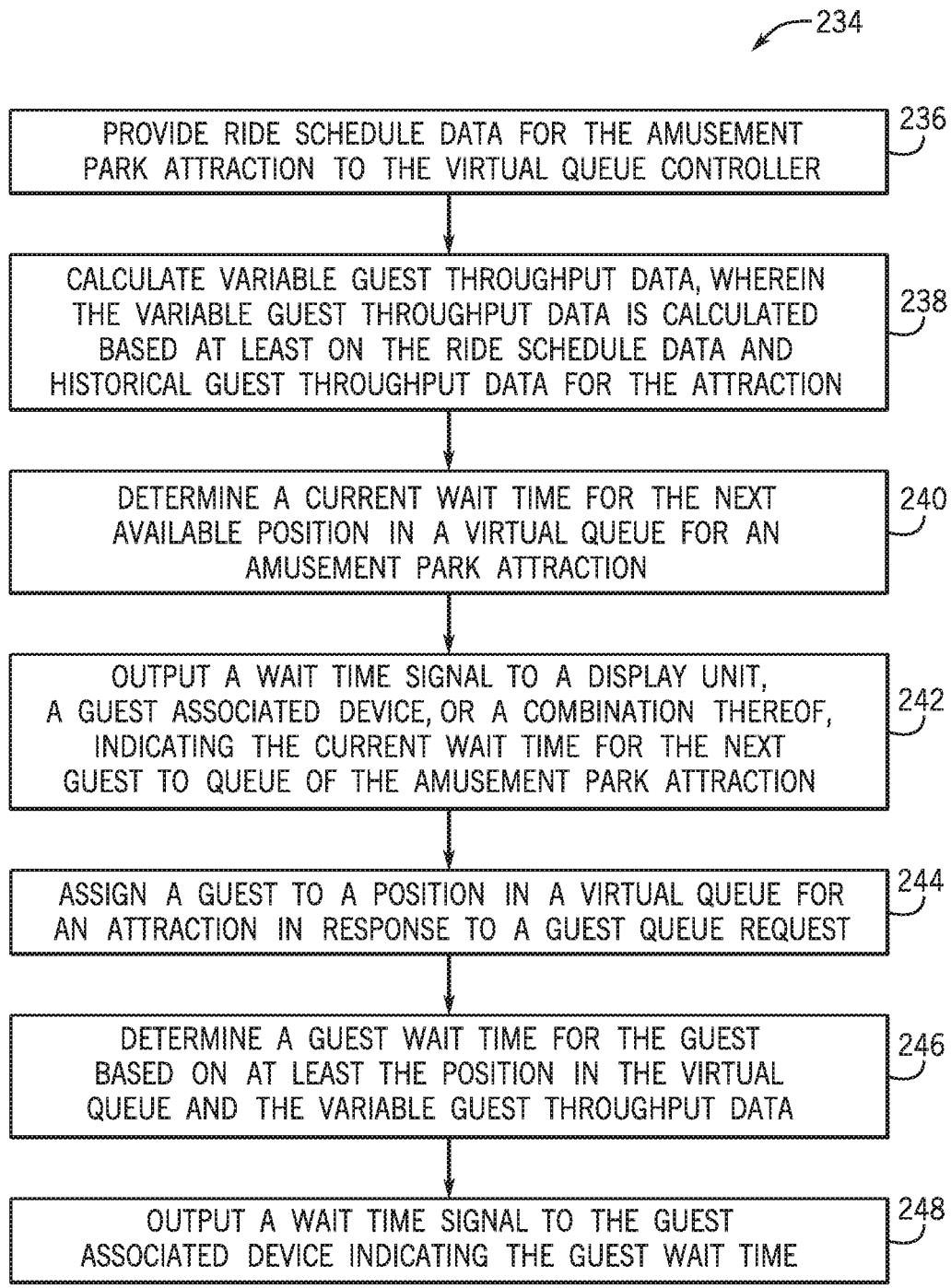
FIG. 2 is a flow diagram of a method using a virtual queue system in accordance with present techniques.

FIG. 2 is a flow diagram of a method 234 of determining the current wait time (e.g., for an as-yet unqueued guest) and the guest wait time for guests in the virtual queue of the attraction 112 using a virtual queue system 114 in accordance with present embodiments. The method includes providing ride schedule data for the attraction 112 to the virtual queue controller 114, wherein the ride schedule data includes specified times for the one or more rides to open and close (block 236), and wherein opening and closing the one or more rides increases or decreases estimated guest throughput of the attraction accordingly, calculating variable guest throughput data, wherein the variable guest throughput data is calculated based at least on the ride schedule data and historical guest throughput data for the attraction (block 238), determining a current wait time for the next available position in a virtual queue for the attraction 112 based on at least the next available position and the variable guest throughput data (block 240), outputting a wait time signal to a display unit, a guest-associated device, or a combination thereof, indicating the current wait time for the next guest to queue for the attraction 112 (block 242), assigning a guest to a position in a virtual queue for an attraction in response to a guest queue request (block 244), determining a guest wait time for the guest based on at least the position in the virtual queue and the variable guest throughput data (block 246), and outputting a wait time signal to the guest-associated device indicating the guest wait time (block 248). Details of the aspects of the method 234 will be discussed in further detail herein with respect to related system features.

In certain embodiments, the method 234 includes the step of further calculating the variable throughput data based on current or real-time guest throughput data. In some embodiments, the method 234 includes the step of providing queue condition data for the attraction 112 to a virtual queue controller 114, wherein the queue condition data includes at least current guest throughput data for the amusement park attraction.

In certain embodiments, the virtual queue controller 130 is configured to continuously or periodically determine the guest wait time and to continuously output the wait time signal to the guest-associated device 120 indicating an updated guest wait time. In other embodiments, the virtual queue controller 130 is configured to determine the guest wait time in response to an update request from the guest. The virtual queue controller 130 may limit the number of update requests that a guest may issue. In other embodiments, the virtual queue controller 130 may limit the rate at which guests may issue update requests. In some embodiments, the virtual queue controller 130 is configured to output the wait time signal when the virtual queue controller determines that the guest wait time has changed by more than a pre-determined amount of time. For example, the virtual queue controller 130 may output a new wait time signal when the guest wait time has changed by more than two minutes.

Figure 3:
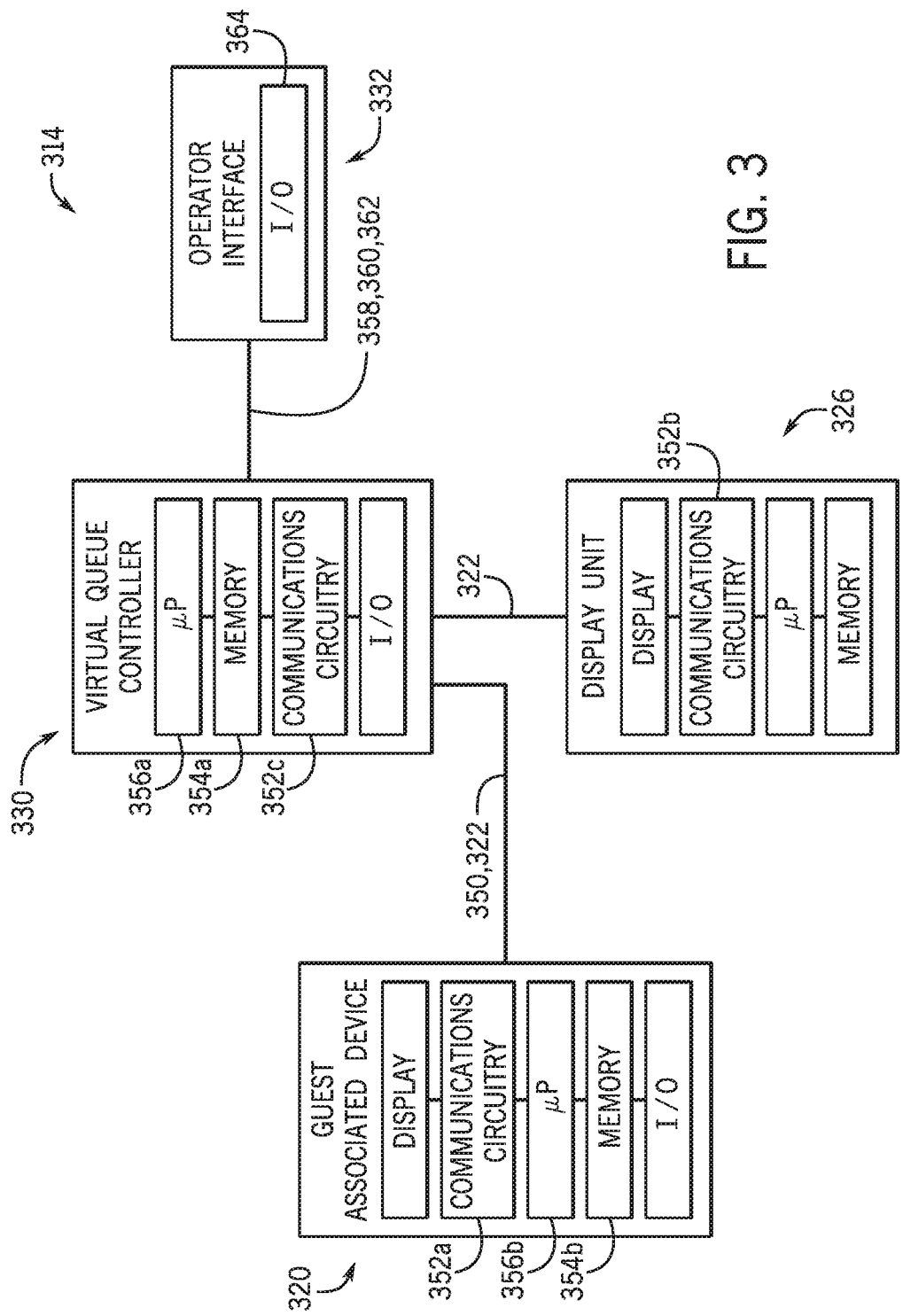
FIG. 3 is a block diagram of a virtual queue system in accordance with present techniques.

FIG. 3 is a block diagram of the virtual queue system 314. The virtual queue system includes a virtual queue controller 330 (e.g., the virtual queue controller 130) in communication with the guest-associated device 320, the display unit 326, or a combination thereof. To enter the virtual queue for an attraction 112, the guest-associated device 320 transmits a queue request signal 350 to the virtual queue controller 330 in response to an input from a guest. The virtual queue controller 330 receives the queue request signal 350, determines a wait time for the guest, and outputs a wait time signal 322 to the guest-associated device 320, the display unit 326, or a combination thereof. The guest-associated device 320 and the display unit 326 are configured to receive the wait time signal 322 and display the wait time for the guest. To enable these communications, the guest-associated device 320, the display unit 326, and the virtual queue controller 330 may include communications circuitry 352, such as antennas, radio transceiver circuits, signal processing hardware and/or software (e.g., hardware or software filters, A/D converters, multiplexer amplifiers), or a combination thereof. The communications circuitry 352 may be configured to communicate over wired or wireless communication paths via IR wireless communication, satellite communication, broadcast radio, microwave radio, Bluetooth, Zigbee, Wifi, UHF, NFC, etc. Such communication may also include intermediate communications devices, such as radio towers, cell towers, etc.

In certain embodiments, the virtual queue controller 330 may include a memory device 354a storing instructions executable by a processor 356a to perform the methods and control actions described herein. For example, the processor 356a may execute instructions for dynamically evaluating virtual queue conditions and determining wait times for guests based on guest throughput inputs 358 and ride schedule data inputs 360 received by the virtual queue controller 330. The ride schedule data inputs may be received through user input, from a memory storage, and/or through cloud services. The virtual queue controller 330 may receive scheduling (or re-scheduling) information in real-time, and may be configured to update wait times based on the updated schedule. In certain embodiments, the virtual queue controller 330 may receive and utilize additional inputs in combination with the ride schedule data inputs 360 and guest throughput inputs 358 when determining wait times.

Further, in certain embodiments, the processor 356a may utilize historical queue condition data inputs 362 (e.g., historical weather information, previous guest behavior within a particular ride/attraction, calendar information (e.g., time of day, day of week, holidays, etc.), demographic information, number of guests within a group(s), and so forth) in combination with the ride schedule data inputs 360 and/or guest throughput inputs 358 when determining wait times. For example, the processor 356a may account for historically slower crowds or colder seasons conditions when providing wait times. As a further example, in certain embodiments, the processor 356a may utilize various characteristics of the guests (e.g., type, gender, age, number, etc.) within the queue, in combination with the ride schedule data inputs 360 and guest throughput inputs 358, in order to determine wait times. While the guest throughput inputs 358, ride schedule data inputs 360, and historical queue condition data inputs 362 are depicted as being received via an operator interface 332, it should be understood that the various inputs to the virtual queue controller 330 may be received from other components of the system 314. In one embodiment, the guest throughput inputs 358 comprise real-time throughput information that is transmitted to the virtual queue controller 330 based on guest-associated device 320 interaction with a check-in or tap-in device or by passing through a gate at each attraction 112. For example, as each guest enters the attraction 112, the associated guest identification information from the guest-associated device 320 is read by a reader comprising communication circuitry and associated with the attraction. In an embodiment, each individual ride 118 of the attraction 112 is configured to provide guest identification from a reader positioned at a top or start of each ride 118. The guest identification information, associated attraction 112 information and/or ride 118 information, and timestamp may be provided to the virtual queue controller 330 as inputs to determine dynamic real-time guest throughput (e.g., guests/hour). Further, the attraction 112 may also include a reader at a ride exit to track total time through the ride 118 as a variable in determining real-time guest throughput. In another embodiment, the real-time guest throughput may be based on operator information. For example, a ride operator may track a number of guests and provide guest numbers periodically to the operator interface 332. Further, the virtual queue controller 330 may store the guest throughput information to update historical queue condition inputs 362 using acquired guest throughput data.

The processor 356a of the virtual queue controller 330 may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, the virtual queue controller 330 may be accessed by an operator interface 332 (e.g., a computer-based workstation or a mobile device, and/or may include an input/output interface 364 and a display).

In certain embodiments, the guest-associated device 320, having a processor 356b and a memory 354b, may be a personal guest device (e.g., smart phone, tablet, laptop, etc.) or a park queue device assigned to guests (e.g., smart wrist bands, portable communication devices, etc.). Park queue devices include a program for viewing wait times and sending queue requests. Guests using personal guest devices may be given access to the program (e.g., web based program, smart phone app., downloadable program, etc.). For example, an admission ticket to the theme park or a confirmation email may include details for finding the program, as well as a username, a passcode, or a combination thereof, for accessing the program. Personal information associated with a guest (height, weight, age, and other demographics) may be linked to the username and/or passcode, such that the guest identification information may be transmitted with the queue request signal. A guest using park queue devices may have their guest information uploaded to the park queue device when the device is assigned to the guest. The virtual queue controller 330 may utilize guest identification information determining wait times as provided herein.

In certain embodiments, the system may include a queue station (e.g., guest kiosk 121) that includes a processor and a memory, and is configured to provide an additional resource for guests to view times and send queue requests. Guests may access queuing functionality on the queue station using a form of guest identification (e.g., username, passcode, card, RF wristband, personal information, etc.). Queue stations may be disposed at various locations around the theme park 110. In some embodiments, at least one queue station is disposed proximate an entrance of each attraction 112, such that guests are provided a means to queue for the attraction 112 at a location proximate the attraction 112. In some embodiments, queue stations may only permit guests to queue for the attraction 112 most proximate the queue station. In other embodiments, general queue stations are located throughout the theme park 110, which may be used to queue for attractions 112 in the theme park 110.

In certain embodiments, the display unit 326 is configured to receive the wait time signal 322 from the virtual queue controller 330 and display current wait times for the attractions 112. In some embodiments, at least one display unit 326 is disposed proximate an entrance of each attraction 112. The display unit may be configured to display only the current wait time for the attraction 112 most proximate the display unit. In other embodiments, general display units are disposed in general locations (e.g., eating areas, walking paths, etc.) around the theme park 110. General display units may display current wait times for a plurality of attractions 112.

Figure 4:
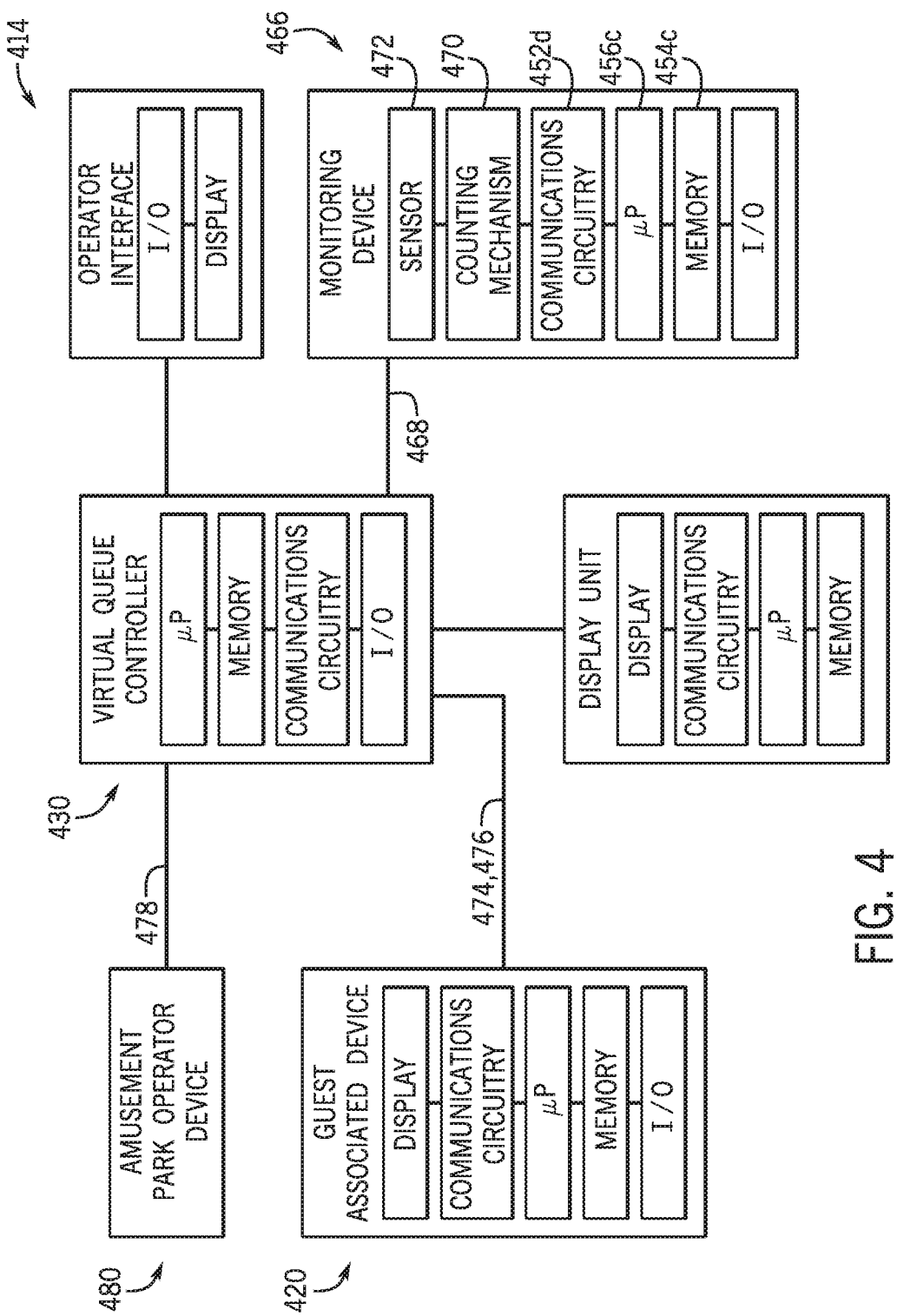
FIG. 4 is a block diagram of a virtual queue system including a monitoring device in accordance with present techniques.

FIG. 4 is a block diagram of the virtual queue system 414 having a monitoring device 466. In the present embodiment, the monitoring device 466 may have communication circuitry 452d to establish communication with the virtual queue controller 430. The monitoring device 466 may also have a processor 456c and a memory device 454c. The monitoring device 466 is configured to monitor and/or determine current queue conditions and output a queue condition signal 468 to the virtual queue controller 430. In some embodiments, the attraction 112 has both a physical queue and a virtual queue. In such embodiments, a guest first enters a virtual queue before entering the physical queue. The physical queue provides a buffer queue or a standby area for the attraction 112 to increase efficiency of the attraction 112. For example, in the event that a guest does not arrive to the attraction 112 at the time designated by the virtual queue system 414, without a physical buffer queue, it is possible that no guest would be present to fill the position of the absent guest. Therefore, at least one ride 118 of the attraction 112 may proceed with less than maximum occupancy of the ride, thereby, decreasing efficiency of the attraction 112. However, using both a physical queue and a standby area, a plurality of guests may be present at the attraction 112 to fill the ride to max occupancy, even when a guest does not arrive on time. In certain embodiments, the monitoring device 466 is configured to monitor current queue conditions of the physical queue. However, the monitoring device 466 may be configured to monitor current queue conditions of the physical queue, the virtual queue, or a combination thereof. Further, in certain embodiments, the attraction 112 may be implemented without a physical queue.

In certain embodiments, the monitoring device 466 may be configured to monitor or determine current queue conditions, including, but not limited to, the length of the queue, number of guests in the queue, flow rate of the guests entering and exiting the queue, particular individuals within the queue (e.g., identify guests in the queue), number of sub-queues within the queue, types of guests within the queue, and so forth. In certain embodiments, the monitoring device 466 may monitor particular locations (e.g., geographical location, queue zones, etc.) within the queue and output the number of guests in each particular location to the virtual queue controller. In certain embodiments, the monitoring device 466 may monitor guests not just at the beginning or end of the queue, but may also monitor whether guests leave the queue in the middle of the queue. In certain embodiments, the monitoring device 466 may determine various characteristics of the guests (e.g., type, gender, age, number, etc.) within the queue and output that data to the virtual queue controller 430 to track and record historical throughput data associated with the queue as it relates to the attraction 112.

In certain embodiments, the monitoring device 466 includes a counting mechanism 470 configured to monitor queue conditions. For example, the number of guests within the queue may be monitored with a counting mechanism 470, which may be a manual system and/or may include one or more sensors disposed proximate to the queue. In other embodiments, the monitoring device may include at least one sensor 472 (e.g., optical sensors, mechanical treadles, RF sensing systems, etc.) disposed physically proximate to the queue, and communicatively coupled to the virtual queue controller 430. The sensors 472 may provide continuous feedback to the virtual queue system 414 associated with current queue conditions. For example, in situations where guests each carry RF identification, RF sensors associated with the monitoring device may be configured to monitor when the particular guest(s) enters and exits the queue and output that data to the virtual controller. As a further example, the sensors 472 may be configured to recognize individual guests at the entrance and exit of the queue and continuously output that information to the virtual queue controller, such that various conditions of the queue (e.g., wait time, queue length, etc.) may be calculated based on length of time individual guests spend within the queue.

Based on the received feedback, the virtual queue system 414 may be configured to dynamically respond to current queue conditions. In certain embodiments, the virtual queue system 414 may include the functionality to automatically remove a guest from the virtual queue based on one or more factors (e.g., been in the queue for an extended period of time past current queue wait time, guest is seen at an unexpected location within the queue, guest enters another queue, guest is recognized outside of the queue, etc.). In certain embodiments, the virtual queue system 414 may virtually monitor and dynamically adjust a plurality of queues (or sub-queues), and may be configured to correlate the data for a variety of queues when calculating or determining current queue conditions.

In certain embodiments, the virtual queue system 414 may utilize the feedback received from the monitoring device 466 to calculate other queue conditions. The virtual queue system 414 may calculate various factors or variables, such as, but not limited to, length of the virtual queue, current or real-time guest throughput, maximum attraction throughput, historical information related to queue conditions and responses (e.g., historical guest throughput), length of time that the queue is in different states (overfill state, under-fill state, starvation state, overcrowding state, etc.), and so forth. For example, based on the number of guests within the queue and/or the flow rate of the guests entering or exiting the queue, the virtual queue system 414 may calculate current wait times, guest wait times, current attraction capacity, and so forth. In particular, the virtual queue system 414 may be configured to determine accurate real-time information related to the queue system and queue conditions, based at least in part on the continuous feedback received from the monitoring device 466.

In another embodiment, in response to determined wait times for guests in the virtual queues and/or physical attraction access areas, the virtual queue system 414 may be configured to output a queue modification signal 474. Specifically, the virtual queue system may be configured to dynamically respond to deviations of the calculated wait times for guests from a wait time range by outputting a queue modification signal 474.

In certain embodiments, the queue modification signal 474 is configured to temporarily disable the ability to add a guest to the virtual queue for an attraction 112 when the wait time for the attraction is longer than a maximum limit of the wait time range. For example, when the virtual queue is deemed too long by the virtual queue controller 430, the virtual queue controller is configured to output the queue modification signal 474 to the guest-associated device 420 (e.g. smart phone, guest kiosk, etc.). The queue modification signal 474 is configured to transmit instructions to a queue program, on the guest-associated device 420, to disable an option to send a queue request for the attraction 112. Additionally, the queue modification signal 474 may include instructions to display a message in relation to disabling a portion of the queue program. Once wait times of the virtual queue fall back down to a length of time within the wait time range, the virtual queue controller 430 may be configured to send a resume signal 476 to enable the option to send queue requests.

In certain embodiments, the queue modification signal 474 includes instructions to notify guests of a shorter than average queue time for an attraction 112 when the wait time for the attraction is shorter than the minimum limit of the wait time range. For example, the queue modification signal 474 may include instructions for the guest-associated device to display a message indicating that the attraction 112 has a short wait time. In some embodiments, the queue modification signal 474 may include instructions to activate a quick queue option in the program on the guest-associated device 120. For example, the quick queue option may activate a pop up message the screen that indicates that the virtual queue has a short wait time. Additionally, the pop up message may include a button configured to immediately enter the guest into the virtual queue for the attraction 112. In certain embodiments, the virtual queue controller 430 is configured to send the queue modification signal 474 to guest-associated devices 420 linked to guests that have experienced fewer attractions 112 during that day than other guests at the theme park 110 before sending the queue modification signal to the other guests, thereby giving a first opportunity to enter the virtual queue to individuals who have experienced fewer attractions 112. In certain embodiments, the program includes an option to dismiss messages activated in response to the guest-associated device receiving the queue modification signal 474. However, once wait times of the virtual queue rise up to a length of time within the wait time range, the virtual queue controller is configured to send the resume signal to automatically dismiss notifications from the queue modification signal.

In certain embodiments, the virtual queue controller is configured to send an attraction modification signal 478 to an amusement park operator device 480 in response to the wait times longer than the maximum limit or shorter than the minimum limit of the wait time range. The attraction modification signal is configured to send instructions to an amusement park operator to open and/or close rides of an amusement park ride 118 to adjust current guest throughput in response to the wait times. In addition to disabling the virtual queue or sending notifications, dynamically opening and closing rides 118 of an attraction 112 may further increase amusement park attraction efficiency.

Figure 5:
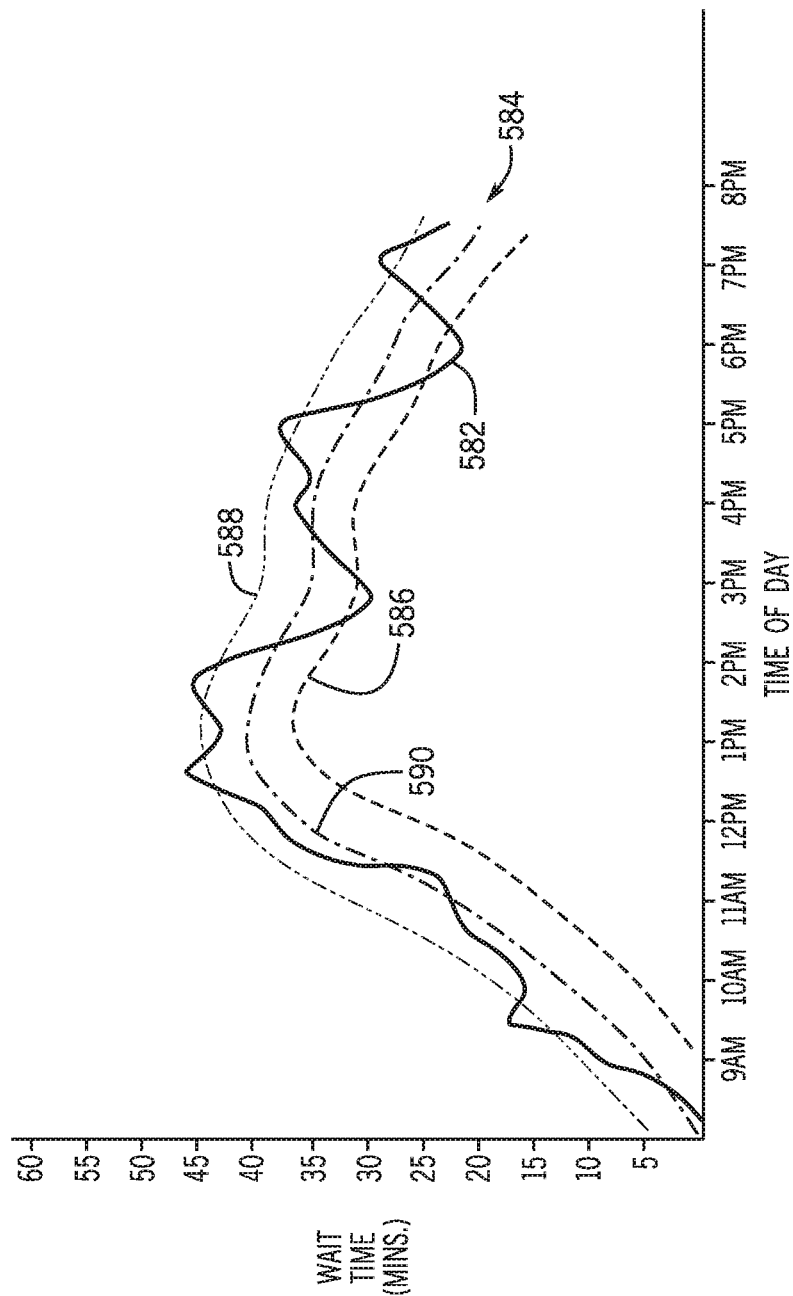
FIG. 5 is a graph showing a wait time range for a virtual queue in accordance with present techniques.

FIG. 5 is a graph showing the wait times 582 and a wait time range 584 for the virtual queue. The wait time range provides a minimum wait time 586 and a maximum wait time 588 for acceptable wait times at particular times, e.g., whereby wait times between the minimum wait time 586 and the maximum wait time 588 may bound a predetermined desired wait time range. When wait times 582 as calculated or estimated by the virtual queue controller (e.g., virtual queue controller 430) as provided herein fall below the minimum wait time 586 or rise above the maximum wait time 588, the virtual queue controller 430 is configured to output the queue modification signal 474. In certain embodiments, the virtual queue controller 430 calculates the wait time range 584 based at least on historical throughput data. The virtual queue controller 430 may determine an average wait time 590 for an attraction 112 for each time slot of a day using the historical throughput data. The virtual queue controller 430 may determine a plurality of average wait times, wherein an average wait time is calculated for each time slot of each day of a week, month, year, etc. For example, the virtual queue controller 430 may calculate an average wait time for an attraction 112 at 10 a.m. by averaging all historical throughput data for the time slot of 10 a.m. However, in other embodiments, the virtual queue controller 430 calculates an average wait time for Monday at 10 a.m. by averaging all historical throughput data for every Monday at 10 a.m. Additionally or alternatively, the virtual queue controller 430 may further utilize historical queue condition data (e.g., historical ride schedule data, historical guest throughput, weather data, guest behavior, calendar information, demographic info, number of groups of guests, size of groups of guests, etc.) in determining the plurality of average wait times 590.

In certain embodiments, the virtual queue controller 430 may calculate the wait time range 584 by adding a wait time buffer to the average wait time 590. For example, the virtual queue controller 430 may calculate average wait times for 9 a.m., 11 a.m., 1 p.m., and 3 p.m. to be five, twenty, forty, and thirty-five minutes respectively. The virtual queue controller 430 may provide a five minute wait time buffer to the average wait times to calculate the wait time range. Thus, the wait time ranges at 9 a.m., 11 a.m., 1 p.m., and 3 p.m. are 0-10 minutes, 15-25 minutes, 35-45 minutes, and 30-40 minutes respectively. In other embodiments, the virtual queue controller 430 may calculate the wait time range 584 using a dynamic wait time buffer. The dynamic wait time buffer may change a length of time of the wait time buffer at different time slots of a day. For example, a wait time buffer at 9 a.m. may be five minutes, while a wait time buffer at 1 p.m. may be fifteen minutes. In other embodiments, the dynamic wait time buffer includes a longer wait time buffer between the average wait time and the maximum limit than the wait time buffer between the average wait time and the minimum limit. In some embodiments, the dynamic wait time buffer may be determined using historical throughput data, operator input, etc.

In certain embodiments, the wait time range may be set based on inputs receive by the virtual queue controller 430. In some embodiments, the virtual queue controller 430 is configured to receive an input from the operator interface 332. An operator may transmit instructions for the virtual queue controller 430 to set specific wait time ranges using the operator interface 332. The operator may set static or dynamic wait time ranges. In some embodiments, an operator may set a wait time range independent of historical throughput data. For example, in the event that an attraction 112 is temporarily under staffed, an operator may adjust the wait time range 584 of the attraction 112 to decrease guest throughput of the attraction 112 until the attraction 112 is properly staffed. In another example the operator may adjust the wait time ranges 584 for a plurality of attractions 112 to encourage guests to queue for the particular attraction 112, in order to prevent overcrowding of other attractions 112 or locations.

In certain embodiments, the virtual queue controller 430 may determine wait times 582 for a position in the virtual queue based on variable guest throughput data and ride schedule data. Generally, the virtual queue controller 430 calculates a variable guest throughput based at least on current guest throughput data, historical throughput data, historical ride schedule data, etc. The variable guest throughput data represents an expected guest throughput for a single ride 118 of the attraction 112 for each time slot during park hours. The virtual queue controller 430 is configured to predict expected guest throughput data at least based on deviations of current guest throughput data with respect to historical throughput data and other queue conditions. To accurately analyze throughput variations and prevent scheduling variations from skewing the calculation, the current guest throughput data and the historical throughput data are first divided respectfully by the number of rides currently open and the number of rides historically open (i.e., to determine current guest throughput data and historical guest throughput data for a single ride). Further, the virtual queue controller 430 is configured to dynamically multiply the expected guest throughput data for a single ride according to the ride schedule data to determine an expected guest throughput for each time slot during the park hours. The virtual queue controller 430 is configured to utilize the expected guest throughput, current queue conditions (e.g., number of guests in queue, etc.) in relation to the guest position to determine wait times.

As an exemplary embodiment, in certain situations, an attraction 112 may include one or more rides 118 that open and close at different times throughout the day. For example, a first ride 118a of an attraction 112 may open concurrently with the opening of theme park 110, and a second ride of the attraction 112 may open an hour after the theme park 110 opens. Each ride of the attraction 112 may have a throughput of 120 guests per hour. Features of the present disclosure enable the virtual queuing system to utilize the scheduled open/close times of each ride during the day to determine wait times for the attraction 112. For example, the virtual queuing system accounts for the delayed opening time of the second ride 118b when determining a wait time for the attraction 112. In this manner, the virtual queuing system may provide an accurate wait time for the attraction 112, rather than an artificially low wait time that would be associated with the cases of all rides 118 being open. In other words, when one or more of the rides 118 are closed, the estimated total guest throughput of the attraction 112 will be reduced. Further, the virtual queuing system 114 accounts for the one hour delay in opening the second ride 118b during wait times assigned before the second ride 118b is scheduled to open.

For example, in an embodiment, a guest requests a position in the virtual queue such that the guest wait time for the attraction 112 encompasses or overlaps a first time period in which a subset of the rides 118 are closed and a second time period in which all of the rides 118 are open. That is, some or all of the closed rides 118 are opened while the guest is in the virtual queue. Accordingly, the attraction 112 has an estimated lower guest throughput during the first time period and an estimated higher guest throughput during the second time period. By using the lower guest throughput and the higher guest throughput, a more accurate guest waiting time may be determined. In this manner, the virtual queuing system may avoid periods of ride starvation (when artificially high wait times are reported), or ride overcrowding (when artificially low wait times are reported).

In one embodiment, for the attraction 112, historical guest throughput data may show that, on average at 1 p.m., the attraction 112 has a guest throughput of 240 guests per hour and a guest throughput at 2:00 p.m. of 220 guests per hour, both with two rides open. The current conditions, as determined by the monitoring device 466, indicate that the current guest throughput of the ride at 1 p.m. is 120 guests per hour with one ride 118a open. However, ride schedule data provided to the virtual queue controller 430 indicate that a second ride 118b is scheduled to open at 1:30 p.m. First, the virtual queue controller may determine that the historical guest throughput for one ride vehicle at 1:00 p.m. is 120 guests per hour, and that the ride throughput per vehicle is on par with historical guest throughput data. However, the historical guest throughput data shows a trend indicating that at 2:00 p.m., guest throughput for one ride vehicle historically decreases to 110 guests per hour. The virtual queue controller 430 may be configured to consider the decreasing guest throughput in calculating wait times. Additionally, although the current guest throughput is only 120 guests per hour, the virtual queue controller is configured to increase the expected guest throughput by a factor of two at 1:30 p.m. to account for the opening of the second ride vehicle. The expected ride throughput should increase to 240 guests per hour minus the anticipated decrease in guest throughput. Thus, the expected ride throughput at 1:30 p.m. may be 230 guests per hour. Using the estimated guest throughput data and current queue conditions in relation to the guest position, the virtual queue controller may dynamically determine wait times 582. Additionally, in certain embodiments, the virtual queue controller may continually calculate the variable guest throughput to account for changes in current guest throughput and other queue conditions, in order to provide guests with updated wait times.

In some embodiments, the virtual queue controller 430 further utilizes other queue conditions to determine wait times 582. Specifically, the virtual queue controller 430 may be configured to consider various factors, such as, but not limited to, previous guest behavior, guests' current activities within and outside of the queue, current location or historical locations of the guest within the park, weather, calendar information (e.g., time of day, day of week, holidays, etc.), demographic information, number of guests within a group (s), and so forth. Further, in certain embodiments, the virtual queue controller 430 may record real-time queue conditions as historical queue condition information for future use. For example, acquired real-time queue conditions may indicate that one ride 118a has historically slower guest throughput relative to the other rides 118b, 118c, even if all three rides 118 are otherwise alike or of a same type. Such slower throughput may be because an entrance in the loading area for the ride 118a is farther from the entrances of the other rides 118b, 118c, because a loading angle involves slower loading, or because show props adjacent the ride 118a cause guests to linger at the ride entrance. Accordingly, a more accurate estimated guest wait time may take into account which of the rides 118 is closed and use historical guest throughput information associated with each individual ride 118. For example, when the slower ride 118a is closed, the estimated guest wait time may use historical guest throughput for the faster rides 118b, 118c and not from the closed slower ride 118a in calculating an estimated guest wait time.

In certain embodiments, the virtual queue controller 430 may be configured to determine the wait times 582 for each attraction 112 based on a coordinated analysis of other queue conditions. For example, in certain embodiments, the virtual queue controller 430 may receive ride schedule data and guest throughput data for a plurality of attractions 112, and may be configured to coordinate the wait times 582 for the attractions 112 based on the received data. In certain embodiments, the virtual queue controller 430 may utilize other types of data to perform a coordination analysis. For example, the virtual queue controller may receive crowd flow data and/or wait times for other rides, and may utilize this data to provide accurate wait times 582 for each attraction 112.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual queue system, comprising:
a virtual queue controller comprising a processor and a memory, wherein the memory stores instructions executable by the processor and is configured to cause the virtual queue controller to:
receive a request, the request being associated with an individual guest, for a position in a virtual queue of an attraction, the attraction comprises a plurality of rides that are accessed by the virtual queue from a common dispatch area;
assign the individual guest to the position in the virtual queue of the attraction in response to the request;
receive information indicative of a status change from an open status to a closed status of an individual ride of the plurality of rides;
determine an updated wait time for the attraction, wherein the updated wait time is based at least in part on a dynamic wait time buffer that changes in duration based on a time of day and the status change of the individual ride of the plurality of rides;
upon determining that the updated wait time is above a first threshold wait time, disabling an ability of the virtual queue controller to add new guests to the virtual queue; and
upon determining that the updated wait time is below a second threshold wait time, enabling a new queuing option that is active while the updated wait time is below the second threshold wait time;
communications circuitry configured to:
output a first wireless signal to a plurality of guest-associated devices to cause the plurality of guest-associated devices to disable the ability of the virtual queue controller to add new guests by disabling a user input on the plurality of guest-associated devices responsive to the updated wait time being above the first threshold wait time; and
output a second wireless signal to the plurality of guest-associated devices to cause the plurality of guest-associated devices to activate a temporary user input associated with the new queuing option.

2. The virtual queue system of claim 1, comprising sending the second wireless signal to a first group of the plurality of guest-associated devices selected based on received tracking data from the first group of guest-associated devices being associated with fewer other attractions.

3. The virtual queue system of claim 1, wherein the virtual queue controller is configured to receive a current location of guests within the part park to determine the updated wait time.

4. The virtual queue system of claim 1, wherein the virtual queue controller is configured to determine that updated wait time based on historical throughput of an open subset of the plurality of rides and not historical throughput of a closed subset based on the status change, wherein the closed subset comprises the individual ride with relatively slower throughput than the open subset.

5. The virtual queue system of claim 1, wherein the virtual queue controller is configured to provide a pop-up notification related to the temporary user input associated with the new queuing option responsive to determining that the updated wait time is below the second threshold wait time.

6. The virtual queue system of claim 1, wherein the virtual queue controller is configured to automatically dismiss notifications related to the updated wait time responsive to determining that the updated wait time is above the first threshold wait time.

\* \* \* \* \*